No. 755,389. PATENTED MAR. 22, 1904.
O. REINLE & H. BAUMGARTEN.
MACHINERY FOR MANUFACTURING POTATO FLOUR BY MEANS OF ROLLS.
APPLICATION FILED MAY 19, 1903.
NO MODEL.

Witnesses
Chas. H. Smith
J. Staib

Inventors
Otto Reinle
Herman Baumgarten
per Harold Serrell
atty

No. 755,389. Patented March 22, 1904.

UNITED STATES PATENT OFFICE.

OTTO REINLE AND HERMAN BAUMGARTEN, OF VIENNA, AUSTRIA-HUNGARY, ASSIGNORS TO GESELLSCHAFT ZUR VERWERTUNG LANDWIRTSCHAFTLICHER PRODUKTE, G. M. B. H., OF BERLIN, GERMANY.

MACHINERY FOR MANUFACTURING POTATO-FLOUR BY MEANS OF ROLLS.

SPECIFICATION forming part of Letters Patent No. 755,389, dated March 22, 1904.

Application filed May 19, 1903. Serial No. 157,812. (No model.)

*To all whom it may concern:*

Be it known that we, OTTO REINLE, a citizen of the Republic of Switzerland, and HERMAN BAUMGARTEN, a subject of the Emperor of Austria-Hungary, residing at Vienna, in the Empire of Austria-Hungary, have invented certain new and useful Improvements in Machinery for Manufacturing Potato-Flour by Means of Rolls, of which the following is a specification.

This invention relates to the machinery for manufacturing potato-flour in which there is employed a grating of stationary knives or cutters operating in connection with a roll the convex surface of which is also furnished with cutters or knives and which have for their object the reduction of the potatoes into slices or pieces, which are then delivered to a pair of heated crushing-rolls which further reduce and also dry the material; and the invention has for its object the cheapening of the manufacturing process, the improvement of the manufactured product, the simplification of the appliances for reducing the potatoes, the lessening of the motive power required, and the shortening of the time of manufacture. We attain these objects by the mechanism illustrated in the accompanying drawings, in which—

Figure 1:
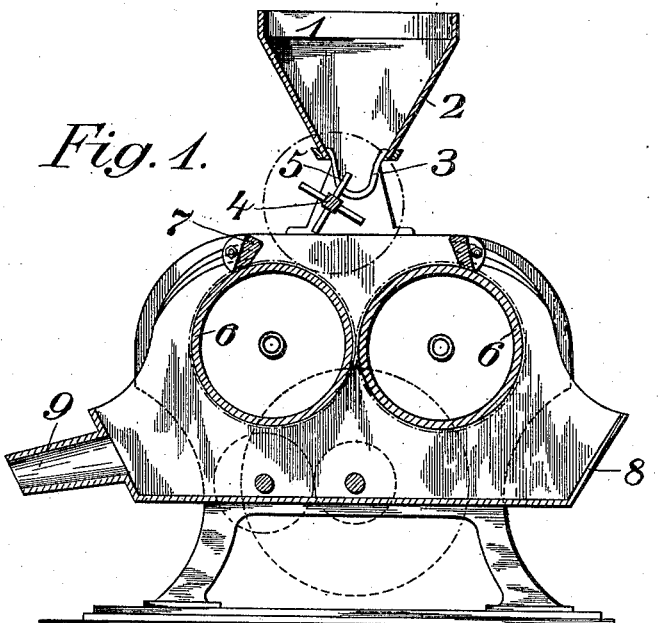
Figure 2:
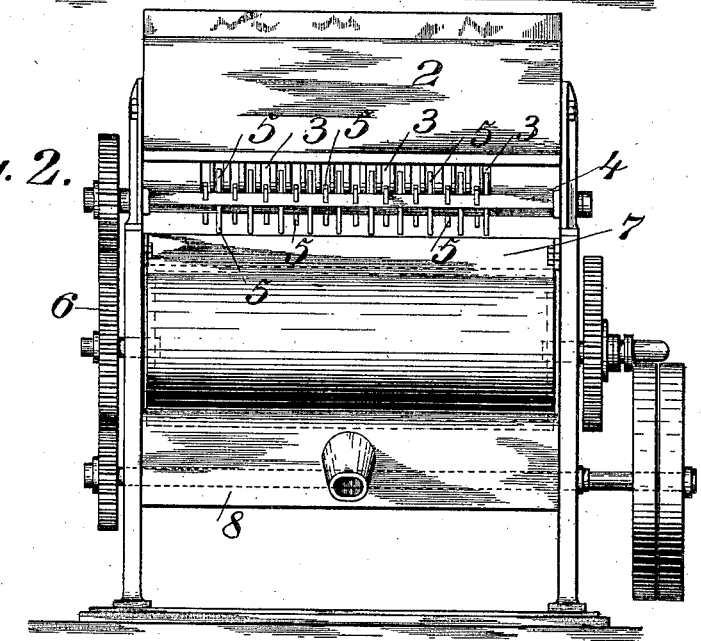

Figure 1 shows a vertical section, and Fig. 2 a front elevation.

Similar figures refer to similar parts throughout the several views.

The previously-cleaned raw or steamed potatoes are delivered in the hopper 1, the bottom 2 of which is closed by a grating 3, made up of dull or of sharp edged knives. Below this grating there is journaled a knife-roll 4, the dull or the sharp teeth of which mesh with the bars of the grate 3, and thereby draw the potatoes out of the hopper, at the same time reducing the material by pressure or by cutting, or by both combined, then letting it drop directly and regularly between the rotating rolls 6, which are situated directly below it and which are heated by steam or in other suitable manner. Between these rolls 6 the material is further crushed and spread out in a thin sheet and by reason of the large surface offered by the heated rolls is dried in a few seconds. The thus reduced and dried material is then shaved off from the rolls 6 by the adjustable stripper 7 and let fall in the box 8. In order to prevent the steam or water vapor which is dried out of the potatoes from condensing in the apparatus itself, it is exhausted therefrom through the nozzles 9, attached to the collecting-box 8. For the purpose of effecting a further reduction or grinding of the dried potato-pulp that is shaved or stripped from the rolls and for the purpose of removing the potato-skins the material can be delivered to suitable grinding and cleaning machinery or apparatus either in connection with the main machine or separate therefrom. In the latter case the material is fed along in any well-known or suitable manner, as by worm conveyer, bucket elevator, &c.

We claim as our invention—

1. In a machine for manufacturing potato-flour, the combination with a hopper having a knife-grate bottom, of a knife-roll to cut the whole potatoes, a pair of steam-heated crushing-rollers and means for removing the steam or watery vapor formed by the material passing between the said pair of rollers.

2. In a machine for manufacturing potato-flour, the combination with a hopper having a knife-grate bottom, of a knife-roll to cut the whole potatoes, a pair of steam-heated crushing-rollers, strippers extending longitudinally of and bearing upon the upper surfaces of the respective rollers, and means for removing the steam or watery vapor formed by the material passing between the said pair of rollers.

3. In a machine for manufacturing potato-flour, the combination with a hopper having a knife-grate bottom, of a knife-roll to cut the whole potatoes, a pair of steam-heated crushing-rollers, strippers extending longitudinally of and bearing upon the upper surfaces of the respective rollers, a collecting-box for receiving the material, and means for removing the steam or watery vapor formed by the material passing between the said pair of rollers.

In testimony that we claim the foregoing as our invention we have signed our names in presence of two subscribing witnesses.

OTTO REINLE.
HERMAN BAUMGARTEN.

Witnesses:
  HANS PAPPENHEIM,
  ALVESTO S. HOGUE.